C. O. FREDRICKSON.
ATTACHMENT FOR THRESHING MACHINES.
APPLICATION FILED APR. 1, 1908.
918,139.
Patented Apr. 13, 1909.
2 SHEETS—SHEET 1.
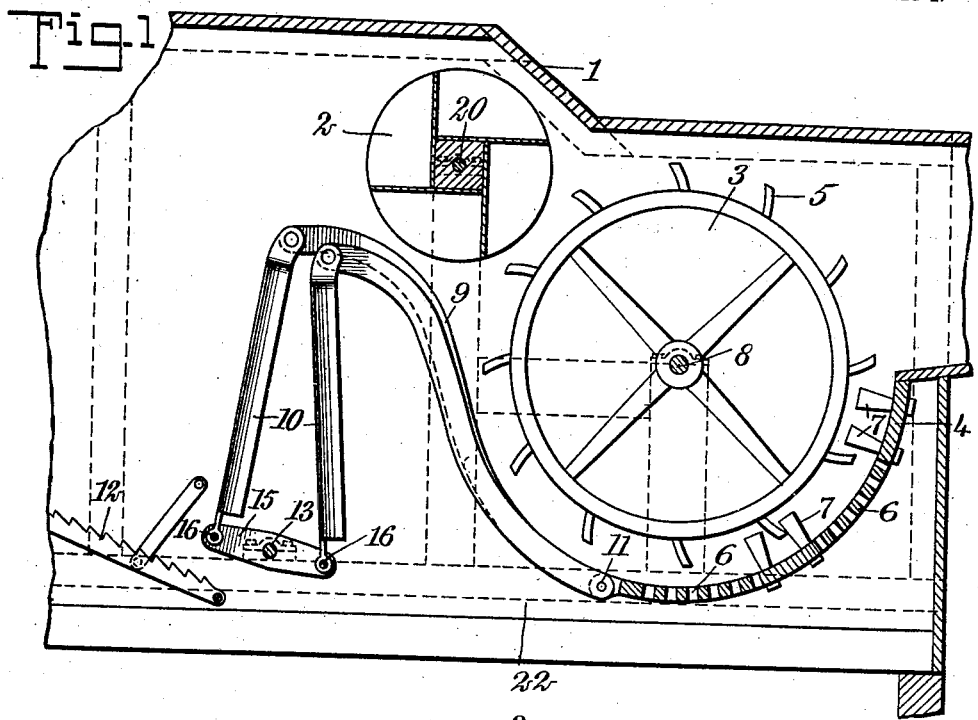
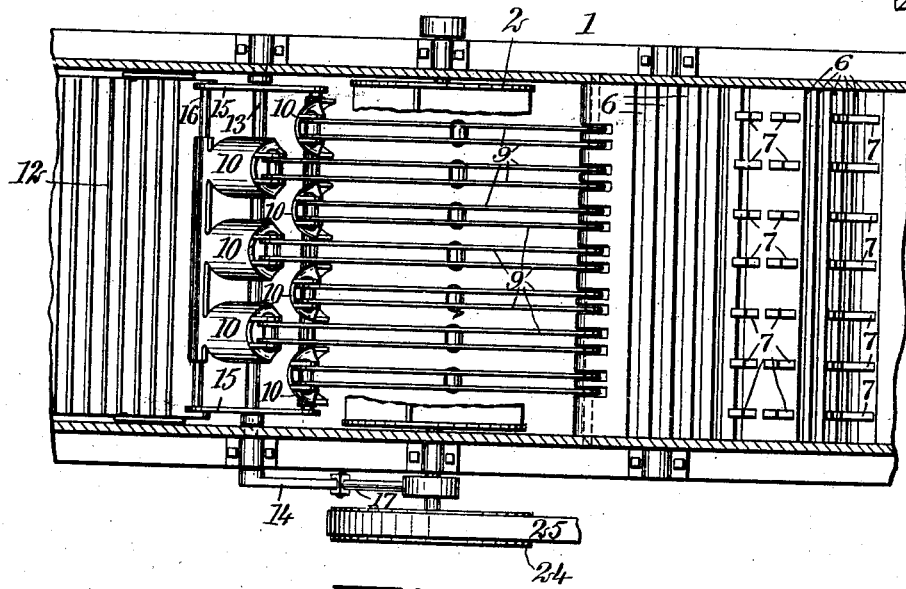
WITNESSES
INVENTOR
Carl O. Fredrickson
BY
ATTORNEYS.

C. O. FREDRICKSON.
ATTACHMENT FOR THRESHING MACHINES.
APPLICATION FILED APR. 1, 1908.
918,139.
Patented Apr. 13, 1909.
2 SHEETS—SHEET 2.
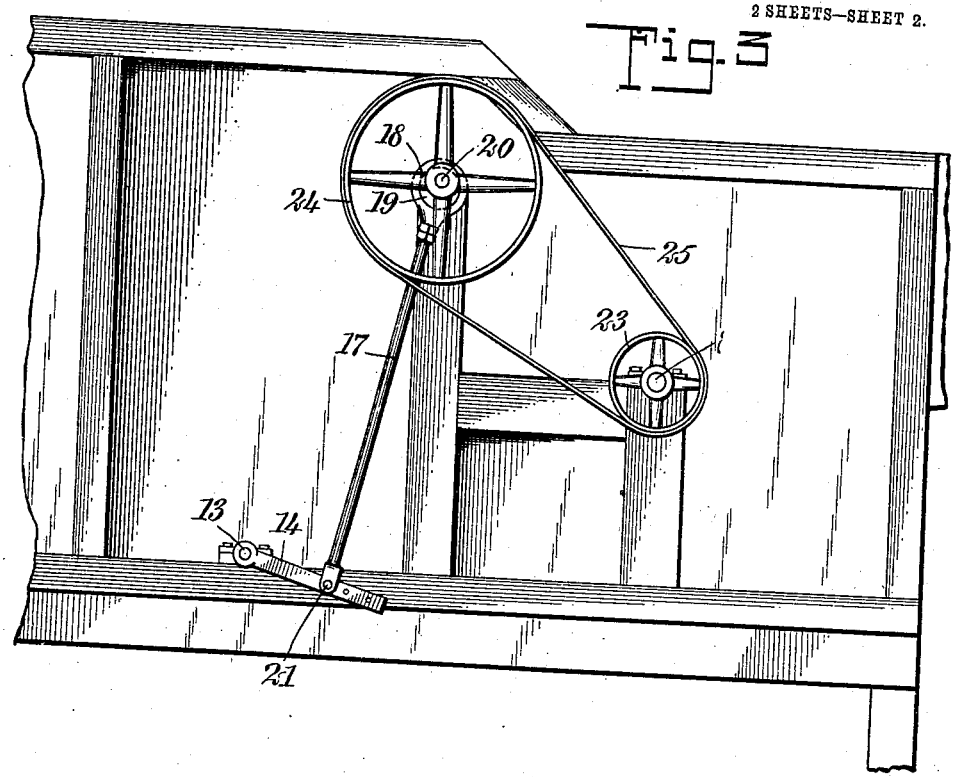
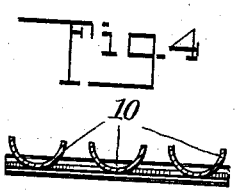
WITNESSES
J. A. Brophy
E. B. Marshall
INVENTOR
Carl O. Fredrickson
BY Munn & Co
ATTORNEYS.

UNITED STATES PATENT OFFICE.

CARL OSCAR FREDRICKSON, OF OSCEOLA, NEBRASKA.

ATTACHMENT FOR THRESHING-MACHINES.

No. 918,139.  Specification of Letters Patent.  Patented April 13, 1909.

Application filed April 1, 1908. Serial No. 424,481.

*To all whom it may concern:*

Be it known that I, CARL OSCAR FREDRICKSON, a citizen of the United States, and a resident of Osceola, in the county of Polk and State of Nebraska, have invented a new and Improved Attachment for Threshing-Machines, of which the following is a full, clear, and exact description.

The invention relates to threshing machines and has for its object to provide a member which forms a continuation of the concave of a threshing machine, the member being formed of slats which are arranged longitudinally of the machine and which assist in separating the grain from the straw, without impeding the movement of the straw through the machine.

Another object is to arrange grain buffers between the working parts of the machine and the straw carrier, which will stop any flying grain and cause it to fall into the grain pan without danger of its becoming intermingled again with the straw.

Still another object of the invention is to provide means to agitate the member which forms a continuation of the concave, to shake the grain free and also to agitate the grain buffers and free them from dust, etc.

Still other objects of the invention will appear in the following description.

In this specification I will describe the preferred embodiment of the invention, but I do not limit myself thereto as I consider myself entitled to all forms and embodiments of the invention which may be held to fall within the scope of the appended claims.

In the drawing similar reference characters indicate like parts in all the figures, in which—

Figure 1 is a longitudinal sectional view of the parts of the threshing machine, showing the application of my invention; Fig. 2 is a plan view of the same, with the top casing and the cylinder removed; Fig. 3 is a longitudinal view of the outside of the machine, showing my preferred means for agitating the grain buffers; and Fig. 4 is a sectional plan view, showing the grain buffers.

Referring to the drawings it will be seen that a casing 1, a beater 2, a cylinder 3 and a concave 4 are arranged as is customary in threshing machines; the cylinder 3 having teeth 5 disposed on its periphery in accordance with the usual custom, and the concave 4 having portions of its surface in the form of a grating as at 6, and also having teeth 7 which are arranged in the usual manner as is familiar to all those acquainted with the art. The cylinder 3 is mounted on a shaft 8 journaled in the sides of the casing.

My invention particularly relates to the grate-bars 9 and the series of links which serve as grain buffers 10, and the means which I will hereafter describe for agitating them. The slatted members 9 are spaced apart and are secured at 11 to the inner terminal of the concave 4. These slatted members are preferably curved and are at an angle so that the straw will pass from the concave 4 upwardly and toward the straw carrier 12, which is arranged and operated in the customary manner. A shaft 13 is journaled in the frame of the machine and extends through one of its sides and has secured thereto an arm 14. To this shaft 13 are attached levers 15, which are disposed near the inner walls of the machine respectively. At the extremities of the arms of the levers 15 are fastened rods 16, which extend across the interior of the machine and are used as supports for a series of links 10. These links which serve as grain buffers are preferably arranged in two rows, each row being supported by one of the two rods 16. I prefer to have the base of the links 10, cylindrical in form so that one of the rods 16 will be passed therethrough which will act as a support for the buffers as stated above. The grain buffers form a continuation of this cylindrical portion and extend upwardly to a point nearly level with the top of the cylinder 3. The buffers are curved and have semi-cylindrical surfaces which have their concave faces fronting the cylinder. To the top of these buffers are pivoted the grate-bars 9, the preferred method of connecting them being as shown in Fig. 1 so that the slatted members will be pivoted alternately to the front and rear rows of buffers respectively.

In constructing the buffers they may be stamped out of a sheet of metal, the lower end of which may be curved in cylindrical form to permit of the introduction of the rod 16. The remainder of the sheet of metal may be cut at predetermined distances to permit the buffers to be curved in semi-cylindrical fashion as shown in the drawings. When the buffers are arranged in this manner as described and are disposed in two rows, it will be found that the buffers will overlap each other which will prevent any of the grain from passing from the working parts of the machine to the straw carrier.

The rod 14 has orifices near its outer terminal which afford means for pivoting an eccentric rod 17 which has a strap 18 at its upper end which co-acts with an eccentric 19 which is secured to a shaft 20 on which the beater 2 is secured. The arm 14 by means of the eccentric rod 17 which is pivoted as at 21 to the arm 14, rocks the shaft 13 when the threshing machine is running, and as the shaft 13 rocks, it by means of the lever arms 15, agitates the links 10 and the grate-bars 9 pivoted thereto. By adjusting the eccentric rod 17 at different places on the arm 14, greater or less agitation of the grate-bars 9 and the links 10 may be secured.

It will, therefore, be seen that in the operation of the threshing machine in which my invention is used, the straw passing up the grate-bars 9 will not be hindered in its movements through the machine, because of the fact that there are no transverse members in which the straw may become caught and that there will be no chance of choking the machine at this point, while by means of the agitation of the grate-bars 9 the grain will be freed from the straw and will fall in the usual grain pan 22 at the bottom of the machine. It will also be seen that the agitation of the links 10 which serve as grain buffers will free them from dust, grain etc., which otherwise might become caught therein. The shafts 8 and 20 have the usual pulleys 23 and 24 respectively and are connected by a belt 25.

Having thus described my invention, I claim as new and desire to secure by Letters Patent:

1. In a threshing machine, a threshing cylinder, a concave, a series of grate-bars pivoted at the rear of the concave and which form a continuation thereof, a series of links attached to and which support the rear ends of the grate-bars, the said links having faces which are adapted to serve as buffers for checking the grain projected by the threshing mechanism, means for supporting the said links, and means for agitating the grate-bars and the links.

2. The combination of a threshing cylinder and a concave, a series of grate-bars pivoted at their lower or forward ends across the machine on the rear edge and forming a continuation of a concave grate, a series of links pivoted to and supporting the rear ends of the grate-bars, the links being formed as buffers for checking the grain projected by the threshing mechanism, and means pivotally connected to said buffers which are adapted to impart alternate oscillation through them to the grate-bars.

3. In a threshing machine, a threshing cylinder, a concave, a series of grate-bars pivoted at the rear of the concave and which form a continuation thereof, a series of links attached to and which support the rear ends of the grate-bars respectively, the said links having concave faces which are adapted to serve as buffers for checking the grain projected by the threshing mechanism, means for supporting the links, and means for agitating the grate-bars and the links.

4. In a threshing machine, a threshing cylinder, a concave, a series of grate bars pivoted at the rear of the concave and which form a continuation thereof, the length of each grate bar being different from the length of a neighbor, a series of links attached to and which support the rear ends of the grate bars respectively, the links having faces which serve as buffers and which form as a whole a wall across the machine for stopping the grain which is projected by the threshing cylinder, and supports for the series of links.

5. In a threshing machine, a threshing cylinder, a concave, a series of grate bars pivoted at the rear of the concave and which form a continuation thereof, the grate bars extending rearwardly, the length of each grate bar being different from the length of a neighbor, a series of links attached to and which support the rear ends of the grate bars respectively, the links having faces which serve as buffers and which form as a whole a wall across the machine for stopping the grain which is projected by the threshing cylinder, and means for agitating the links which also serve as their supports.

6. In a threshing machine, a threshing cylinder, a concave, a series of grate-bars pivoted at the rear of the concave and which form a continuation thereof, a series of links which are attached to the grate-bars respectively at a plurality of distances from the threshing cylinder, the links having faces which serve as buffers and which form as a whole an unbroken wall across the machine for stopping the grain which is projected by the threshing cylinder, rods to which the lower terminals of the links are pivoted, a lever to which the rods are secured, and means to rock the lever.

In testimony whereof I have signed my name to this specification in the presence of two subscribing witnesses.

CARL OSCAR FREDRICKSON.

Witnesses:
 IRA BANTA,
 E. C. NORDLUND.